(12) United States Patent
Gormish

(10) Patent No.: US 7,711,834 B2
(45) Date of Patent: May 4, 2010

(54) NETWORK ACCESS TO PARTIAL DOCUMENT IMAGES

(75) Inventor: Michael Gormish, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 1349 days.

(21) Appl. No.: 10/614,877

(22) Filed: Jul. 7, 2003

(65) Prior Publication Data

US 2006/0170955 A1    Aug. 3, 2006

Related U.S. Application Data

(60) Provisional application No. 60/433,296, filed on Dec. 13, 2002.

(51) Int. Cl.
G06F 15/16 (2006.01)
G06F 3/12 (2006.01)
H04N 1/32 (2006.01)
H04N 1/41 (2006.01)
H04N 1/387 (2006.01)

(52) U.S. Cl. .................. 709/229; 358/1.15; 358/426.01; 358/450

(58) Field of Classification Search .................. 709/229
See application file for complete search history.

(56) References Cited

U.S. PATENT DOCUMENTS

| | | | |
|---|---|---|---|
| 6,331,869 B1 * | 12/2001 | Furlan et al. ................... 348/36 |
| 6,466,210 B1 * | 10/2002 | Carlsen et al. ............... 345/629 |
| 6,650,326 B1 * | 11/2003 | Huber et al. ................. 345/428 |
| 6,704,024 B2 * | 3/2004 | Robotham et al. ........... 345/581 |
| 6,792,153 B1 * | 9/2004 | Tsujii ........................... 382/239 |
| 7,110,608 B2 * | 9/2006 | Chan et al. ................... 382/239 |
| 2002/0018598 A1 * | 2/2002 | Maeda et al. ................ 382/239 |
| 2002/0057843 A1 * | 5/2002 | Matsubara ................... 382/240 |
| 2002/0057850 A1 * | 5/2002 | Sirohey et al. ............... 382/299 |

FOREIGN PATENT DOCUMENTS

| | | |
|---|---|---|
| JP | 2002-152744 | 5/2002 |
| JP | 2003-179760 | 6/2003 |
| JP | 2004-096373 | 3/2004 |

OTHER PUBLICATIONS

Louise H Sharp II and Robert Buckley; "JPEG 2000.jpm file format: a layered imaging architecture for document imaging and basic animation on the web"; Jul. 13, 2000; SPIE; Applications of Digital Imaging Prexessing XXIII, vol. 4115.*

(Continued)

*Primary Examiner*—Moustafa M Meky
*Assistant Examiner*—Blake Rubin
(74) *Attorney, Agent, or Firm*—Blakely, Sokoloff, Taylor & Zafman LLP

(57) ABSTRACT

A method and apparatus for transporting portions of document images across a network in response to one or more requests are described. In one embodiment, the method comprises receiving a plurality of requests for portions of a JPM file and transmitting a JPM file in parts in response to the plurality of requests.

69 Claims, 10 Drawing Sheets

OTHER PUBLICATIONS

David Taubman et al., "Architecture, Philisopy and Performance of JPIP: Internet Protocol Standard for JPEG2000," Proceedings of SPIE, Bellingham, VA, U.S.A., vol. 5150, No. 1, 2003 pp. 791-805. p. 791-796, para 2. p. 800, para 3. p. 802, para 3. XP002282186.

SPIE: "Abstract Publication". Retrieved from Internet: URL: http://bookstore.spie.org/index.cfm?fuseaction=DetailPaper&ProductID=502889&coden=>, retrieved on Oct. 8, 2004, 1 page. The whole document. XP002282186.

Robert Buckley et al., "JPEG 2000 Image Coding System, Compound Image File Format", ISO/IEC CD 15444-6, Mar. 9, 2001, pp. 1-42, XP-002300616.

Martin Boliek et al., "JPEG 2000 for Efficient Imaging in a Client/Server Environment," Applications of Digital Image Processing XXIV, 2001, pp. 212-223, vol. 4472, Proceedings of SPIE, Bellingham, VA, U.S.A. XP008010308.

Robert Prandolini et al., "JPEG 2000 Image Coding System, Interactivity Tools, APIs and Protocols", ISO/IEC CD 15444-9, Mar. 14, 2003, pp. 1-73, XP-001150721.

J. Scott Houchin et al., "File Format Technology in JPEG 2000 Enables Flexible Use of Still and Motion Sequences," Signal Processing: Image Communication, 2002, pp. 131-144, vol. 17, Elsevier Science B.V., Amsterdam, The Netherlands.

Michael W. Marcellin et al., "An Overview of JPEG-2000", Data Compression Conference, Mar. 28, 2000, pp. 523-541, IEEE, Los Alamitos, CA, U.S.A.

David Taubman, "Proposal and Implementation of JPIP (Jpeg2000 Internet Protocol) in Kakadu c3.3", Aug. 9, 2002, pp. 1-37, XP002260543.

European Search Report, Nov. 11, 2004, 4 pages.

David Taubman et al., "Architecture, Philosopy and Performance of JPIP: Internet Protocol Standard for JPEG2000," Proceedings of SPIE, 2003, pp. 791-805, vol. 5150, No. 1, SPIE, Bellingham, VA, U.S.A.

David S. Taubman et al., Abstract of "Architecture, Philosophy, and Performance of JPIP: Internet Protocol Standard JPEG2000," retrieved from the Internet, URL: http://bookstore.spie.org/index.cfm?fuseaction=DetailPaper&ProductID=502889&coden=>, retrieved on Oct. 8, 2004, 1 page.

Robert Buckley et al., JPEG 2000 Image Coding System, Compound Image File Format, ISO/IEC CD 15444-6, Mar. 9, 2001, pp. 1-42, XP-002300616, ISO IEC.

Martin Boliek et al., "JPEG 2000 for Efficient Imaging in a Client/Server Environment," Applications of Digital Image Processing XXIV, 2001, pp. 212-223, vol. 4472, Proceedings of SPIE, Bellingham, VA, U.S.A.

Robert Prandolini et al., JPEG 2000 Image Coding System, Interactivity Tools, APIs and Protocols, ISO/IEC CD 15444-9, Mar. 14, 2003, pp. 1-73, XP-001150721.

Michael W. Marcellin et al., "An Overview of JPEG-2000," Data Compression Conference, Mar. 28, 2000, pp. 523-541, XP010377392, IEEE, Los Alamitos, CA, U.S.A.

David Taubman, "Proposal and Implementation of JPIP (Jpeg2000 Internet Protocol) in Kakadu v3.3," Aug. 9, 2002, pp. 1-37, XP002260543.

Buckley, Robert, et al., "JPEG 2000 Image Coding System: Compound Image File Format", Nov. 16, 2001, 80 pgs., ISO/IEC JTC/SC 29/WG1 N2401.

\* cited by examiner

Image Divided into Tiles and Subbands

Subbands Divided into Precincts

Subbands Combine to Produce Various Resolution Images

Code-block Divided into Bitplanes and Coding Passes

NETWORK ACCESS TO PARTIAL DOCUMENT IMAGES

This application claims the benefit of U.S. Provisional Application No. 60/433,296 entitled "JPEG 2000-Like Access Using the JPM Compound Document File Format," filed Dec. 13, 2002.

FIELD OF THE INVENTION

The present invention relates to the field of transporting partial document images over a network or other communication channel; more particularly, the present invention relates to transporting a JPM file in parts in response to a request.

BACKGROUND OF THE INVENTION

JPEG 2000

FIG. 1A-D illustrate operations performed by a typical JPEG 2000 system. Referring to FIG. 1A, an original image may be divided into regular tiles, such as tiles 101. These tiles are compressed independently. Thus, the coded data from the upper left tile is sufficient to reconstruct the upper left part of the image. Likewise, any region can be reconstructed by obtaining the data from all the tiles that intersect that region and decoding them.

A two-dimensional wavelet transform is performed on each tile. This leads to a set of wavelet coefficients grouped in subbands, such as subbands 102. One of the subbands is a low resolution version of the image—it is exactly the same image as would be obtained by operating a particular low pass filter on the entire image and subsampling. Importantly, that subband can be combined with other subbands to form intermediate resolution versions of the image. This is shown in FIG. 1C. Thus, a JPEG 2000 codestream provides access to images at low resolution, and resolutions larger by a factor of 2 horizontally and vertically, up to the full resolution of the image.

The wavelet transform coefficients are regrouped, or divided, into "precincts," such as shown in FIG. 1B. These precincts form an alternative mechanism to access spatial regions of an image. Tiles and precincts can both be used when compressing an image. If both are used, the tiles provide a coarse grain access to regions of the image, while the precincts provide access to more localized regions.

Finally, precincts are divided into code-blocks and these groups of wavelet coefficients are compressed with multiple passes, starting with the most significant bit and proceeding to the less significant bits. This is shown in FIG. 1D. These "coding-passes" remove statistical redundancy in a lossless manner. For example, large numbers of zero bits are replaced by much shorter codes. The fixed sized block of wavelet coefficients thus becomes a variable length segment of coded data. The first part of the segment is the most important part because it corresponds to the most significant bits of the wavelet coefficients. If the later parts of the coded data segment are not available to a decoder, an image can still be obtained, but it is just of lower quality.

A "codestream" is defined in JPEG 2000 Part 1 as consisting of a series of "marker segments" which are essentially two byte codes identifying the next bit of data in the codestream, followed by the data. The codestream contains all the entropy coded data for the image, and data describing the method, which should be used to decode the coded data. For example, the codestream contains information about the wavelet transform used, the size of tiles, precinct sizes, information about the number of resolutions, the order of packets in the file, etc. The codestream must contain all the parameters needed to decode the entropy coded data into image samples. The codestream may also contain information to provide rapid access to portions of the coded data, e.g., lengths of the packets.

A "file-format" is a wrapper for one or more codestreams. JPEG 2000 Part I defines a simple "JP2" file format. JPEG 2000 Part 2 defines the "JPX" format to store more complex information. JPEG 2000 Part 3 defines the "MJ2" file format for motion JPEG 2000.

File-formats typically provide "meta-data" associated with the image data contained in the codestream, e.g., audio, XML information, image capture conditions. The file format also commonly contains information about the color space of the decoded image data.

JPEG 2000 Part 6 defines the "JPM" file format for compound documents. There are also file-formats not defined by the JPEG 2000 committee that could contain JPEG 2000 codestream. PDF has been recently updated to allow JPEG 2000 codestreams. PDF and JPM are good file formats for documents with multiple pages.

JPIP

JPIP stands for JPEG 2000 Interactive Protocol and will become an international standard, ISO/IEC 15444-9. The JPEG committee is still working on this document, which is nearing the final draft stage. The current document is "15444-9 (JPIP) FCD Study Text 0.1" ISO/IEC JTC1 SC29JWG1 N2396.

JPIP defines a syntax a client can use to make requests to a server for portions of an image. JPIP also defines two new "media-types" that a server can use to return portions of a JPEG 2000 file or codestream. A key facet of JPIP is that it is meant to be interactive. Thus, there can be follow up requests for more data from the same image, and the returned data should not have to repeat data the client has already received.

JPIP Requests

JPIP defines several parameters that can be used by a client in making a request. These requests indicate the sub-image in which the client is interested. The requests also may provide information about what meta-data the client is interested in and information to control the type of response given by the server. The most important parameters for purposes of this disclosure are frame size, region offset, and region size.

The frame size parameter appears as "fsiz=128,128" in several examples, and indicates the size of the entire image the client wishes to use to access a region. If there is no region size parameter (as described below), the frame-size is simply the size of the image the client wants. For example, an image that is 512 by 512 samples and encoded with 4 levels of wavelet transform can be accessed with a frame size of 512 by 512, 256 by 256, 128 by 128, 64 by 64, or 32 by 32. In the first request to the server, the client may not know the actual frame-sizes available. In this case, the client can indicate a desired size and a rounding method, and the server will return the closest available size (the other parameters will be scaled to match the actual frame size used).

The region offset parameter might be used as "roff=64,64" and indicates that the client is not interested in the entire image, but only in a region beginning at the offset specified by the two values given in the request. The offset is relative to the request frame-size.

The region size parameter might be used as "rsiz=64,64" and indicates the size of the region desired by the client. Instead of providing the three parameters fsiz, rsiz, and roff, a client may indicate interest in file or server defined regions of interest (ROI) with the "roi" parameter. The roi parameter can be used to request a named region identified in one of the file format boxes. The value may be set to "dynamic" as in "roi=dynamic" to indicate that the server should choose the appropriate region based on any knowledge of the client.

Responses

JPIP responses can take three main forms: complete image file, tile-part stream also called JPT-stream, or precinct stream also called JPP-stream. The complete image file return type is essentially like returning a custom file that has been generated on the basis of the request. The two stream return types are compound responses that consist of a series of small "messages." Each message has a header, which identifies its type, its index within that type, the offset of the message into the "data-bin" with that type and index, and the length of the message. The "data-bins" can be thought of as representing all information a client might ever request about a resource on the server. In response to a single request a server might deliver a portion of several different data-bins. The messages typically do not contain a complete data-bin; instead they contain a portion of the next part of the data-bin that has not yet been sent to the client. Small message sizes allow data for different portions of the image to be interleaved, and thus a region specified by the client can grow uniformly in quality. Likewise, image data may be interleaved with meta-data. Providing the lengths of each message allows the stream to be elegantly terminated at the end of any message. This allows a server to stop responding to one request and begin responding to a new request on the same communications channel.

JPM

JPM is intended to provide storage for document images. One of the key benefits of JPM over other file formats commonly used to contain images compressed with JPEG 2000 is the ability to handle a large number of pages. In fact, the introduction to the JPM standard describes use of JPM to store an entire encyclopedia. Because of the ability to include other files, there can be many files storing the pages of the encyclopedia, but it is possible to "browse" from page 1 to the end, with a user agent stepping through all the necessary files.

All of the data in a JPM file appears in a "box". A box is an organizational unit that always contains a length and a type. From these two fields, any program or user accessing the file can determine the type. If the type is not understood by a decoder or unneeded for the particular task, the program or user can use the length to locate the next box. Many files can be decoded or otherwise used effectively without knowing all of the types of boxes. Some boxes only appear inside other boxes. Once again, the length field can be used to skip a box that is unknown or unneeded for the current task whether the box appears at the "file level" or inside another box. Some boxes contain data values that indicate the number of bytes from the beginning of a file to some data, usually another box, or a portion of a compressed codestream. These data values are often referred to as "pointers" because they indicate the location of something else. These data values are also often referred to as "offsets" because they indicate the distance in bytes from the beginning of a file.

Important Boxes

The JPM file format allows the use of many different box types. Some specific boxes are described in greater detail below.

Data Reference Box

The Data Reference Box lists all external files necessary to fully decode the current file. The Data Reference Box provides both a list of all other files that might be necessary to make full use of the JPM file and serves as a way to provide a short two-byte code for external data segments. Other data in a JPM file that makes use of data outside of the JPM file includes only a data reference id number, which is the number within the list of external references. Only the Data Reference Box contains the actual "path" or "URL" to another file (which might be quite long, and are certainly of different lengths). This feature makes it easy to change external references from one file to another, by updating only one box.

Contiguous Codestream Box

The Continuous Codestream box contains a complete codestream. The codestream is decoded by using normal JPM decoders to create a mask or image object. The codestream box itself does not indicate the purpose of the codestream; rather other boxes may contain a reference to a contiguous codestream box. Thus, the same codestream can be used for multiple objects perhaps on different pages.

Fragment Table Box

The Fragment Table box is an alternative way to address codestreams for layout objects. While the contiguous codestream box must contain the entire codestream in order, the Fragment Table box allows a codestream to be stored as small segments called fragments each in a different location. The Fragment Table box contains a list of fragments of the codestream. Each fragment must be contiguous, but the full codestream is obtained by concatenating all of the usually discontinuous fragments. The fragments can be stored within the same file as the Fragment Table box or in external files listed in the Data Reference box or both. Fragments within the same file are commonly in Media Data boxes.

Page Collection Box and Page Table Box

A Page Collection box is a way to group pages in a JPM file. The Page Collection box contains a Page Table box that is a list of pages and other Page Collection boxes. By including other page collections, a very large "document" can be represented. For example, the highest level page collection might represent a "library" with each of its page collections representing a "book" and each next level page collection representing a chapter, and the final Page Collection box listing pages in the chapter. No image data is contained in the Page Collection and Page Table boxes; they simply contain pointers to page boxes.

Page Box and Page Header Box

The Page box contains a set of other boxes including the Page Header box and Layout Object boxes for the page. The Page Header box contains information about the page: width, height, orientation, and color.

Layout Object Box and Layout Object Header Box

The Layout Object box contains the Layout Object Header box, object boxes, and optionally additional boxes. The Layout Object Header box contains fields with information about the layout object: identifier, height, width, horizontal and vertical offset (of the image data), and a style.

Object Box and Object Header Box

The Object box contains the Object Header box and optionally additional boxes. The Object Header box contains fields with information about the object (mask or image). The fields are: type, codestream indicator, horizontal and vertical offsets (of image data), offset of Contiguous Codestream box or Fragment Table box, length of Contiguous Codestream or Fragment Table box, and a data reference number which allows access to other files through the Data Reference box which is stored elsewhere in the file. The most important elements for this disclosure are the offset and length of the codestream boxes, because these elements need to be accessed to render the images.

Shared Data Entry Box

The Shared Data Entry box is designed to contain a box that is used repeatedly in the file. The box consists of an id value, and the shared data. Instead of including a box multiple times in different places in the JPM file, a Shared Data Reference box can be used, and the data within the shared data entry box will be used. It is anticipated by the standard that the contents will be a box. However, the data within a Shared Data Entry box can be anything at all, since it will not be read unless a Shared Data Reference box is used.

Shared Data Reference Box

A Shared Data Reference box consists solely of the length and type fields that all boxes contain, and an id field. The id field is used to identify the Shared Data Entry box that should be used in place of the Shared Data Reference box at the location of the Shared Data Reference box. For example, if the same layout objects were used in multiple pages of a file, the Layout Object Header box might be stored once in a Shared Data Entry box, then in each layout box within each page box that would normally contain a complete copy of the Layout Object Header box, a Shared Data Reference box can be used instead. The Shared Data Entry box that the Shared Data Reference box uses must appear in the same file as the Shared Data Reference box and before any Shared Data Reference box with the same id.

JPM File Structure

FIG. 5 shows an outline of an exemplary JPM file with the details being shown for boxes and offsets. The file corresponds to a possible encoding of the two-page document shown on the left side of FIG. 4 described later. FIG. 5 shows one line for each box in the file, in the order the boxes appear in the file. Box names beginning at the left hand side of FIG. 5 appear at the top level of the JPM file. Indented box names represent boxes that are sub-boxes of the first box above them that is closer to left side of FIG. 5. Required boxes are shown, but many optional boxes are not shown to avoid obscuring the present invention. Some field names within a box are shown on the line after the box name and appear in FIG. 5 in italics. Most field names are not shown at all, while many of those field names that contain offsets are shown. These are shown along with an arrows pointing to where the offset goes.

The particular file in FIG. 5 has all offsets pointing to objects beyond the current object, except for the pointers to the primary page collection box. This is a legal order, but is not required. For example, the Shared Data Entry boxes could immediately follow the Compound Image Header box, the Fragment Table box could follow the Shared Data Entry boxes, Page boxes could follow the Fragment Table boxes and Contiguous Codestream boxes, and/or the Page Collection box could appear last. In this ordering, all of the offsets would be to items already having occurred in the file. Note that while the offsets have been drawn as pointers, they are actually offsets from the beginning of the file, not from the current location in the file. Thus, all pointers to the primary Page Collection box have the same value.

In FIG. 5, each text like object has been encoded with a single codestream and stored in a Contiguous Codestream box. Each image like object has been coded with JPEG 2000, the JPEG 2000 codestream has then been split into a pair of Shared Data Entry boxes, and addressed with a Fragment Table box.

FIG. 6 shows information similar to FIG. 5 except that the specific order in the file is not shown (since this may vary), and only boxes at the top level of the file are shown. The pointers that are shown usually occur deeply nested inside the top level boxes as was shown in FIG. 5. However, FIG. 6 allows the "structure" of the file to be more plainly illustrated. Many operations performed in a JPM client server may be understood by considering the top-level file boxes and the overall structure in the file. FIG. 6 also has the codestream stored in a Media Data box rather than in a Shared Data Entry box.

If the offsets stored in the JPM file are to the first byte of the a box, then the arrows is shown pointing to the top of the box. If the offsets stored in the JPM file are to the contents of a box, and thus point to the bytes of the codestream rather than the containing box, then the arrows are shown pointing to the side of the box. In this case, it is possible that different offsets will address different points in a box. For example, the Fragment Table box with two arrows to the media data box would typically address different ranges of the media data box for each fragment.

SUMMARY OF THE INVENTION

A method and apparatus for transporting portions of document images across a network in response to one or more requests are described. In one embodiment, the method comprises receiving a plurality of requests for portions of a JPM file and transmitting a JPM file in parts in response to the plurality of requests.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
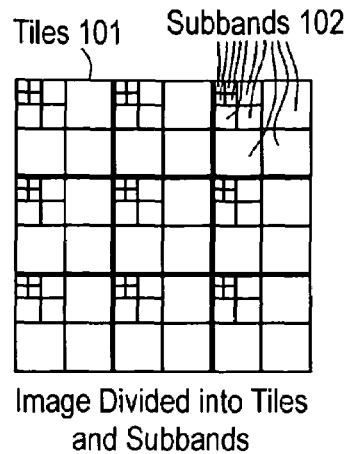
FIGS. 1A-1D illustrate operations of a JPEG 2000 system.
Figure 1B:
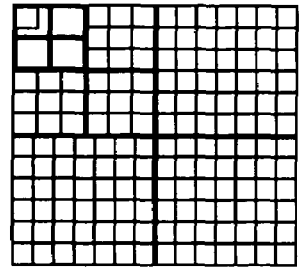
Figure 1C:
Figure 1C:
Figure 1C:
Figure 1D:
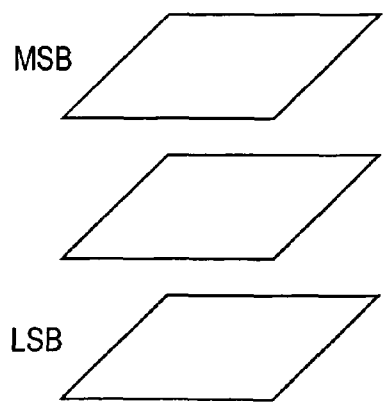

Techniques for transporting portions of document images, particularly those associated with JPM files, across a network in response to one or more requests are described. Because JPM files are well suited to store files with several pages of image data, and because the image data may be stored at print resolution, the files can be very large. It is often desirable to view only a portion of the data. For example, a subset of pages, only part of a page, or a low resolution version of part of a page may be desired. The following describes how a large JPM file may be stored to facilitate the access of portions of a document, how a client might issue requests for portions of the document, and how a server might respond to requests. In many cases, new files are created by the server in order to avoid sending too much data to the client and thus delaying the ability to see (or use) the portion of the data desired.

In the following description, numerous details are set forth to provide a more thorough explanation of the present invention. It will be apparent, however,.to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium or delivered over a network, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Client, Server, and Network

Figure 2:
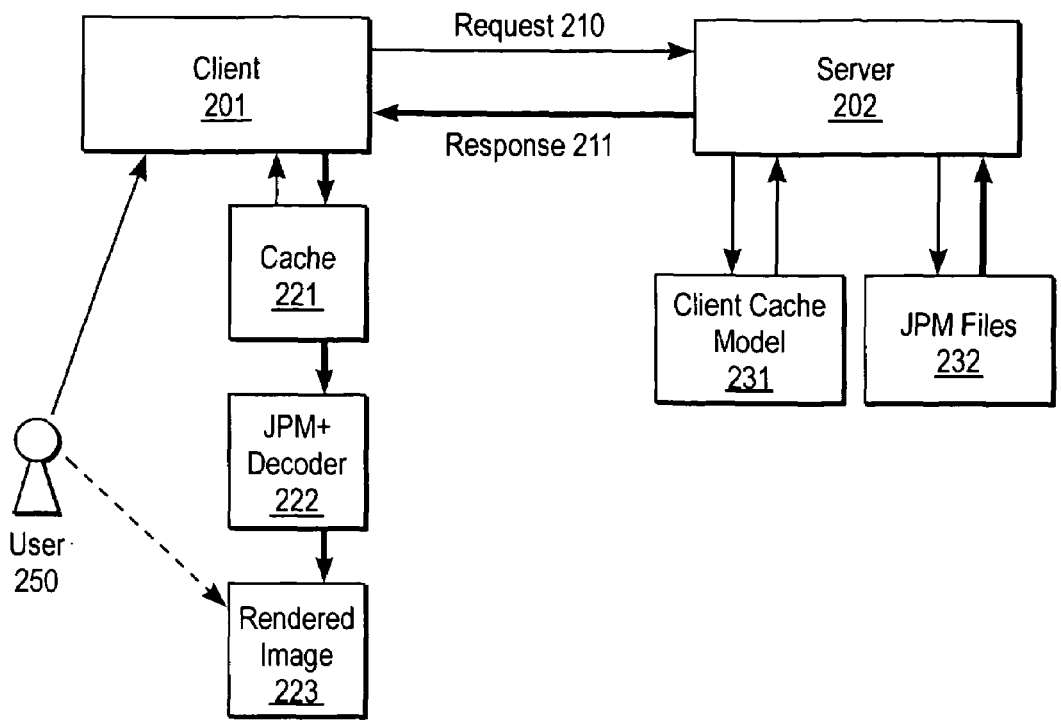
FIG. 2 illustrates a client and a server for communication of compressed images.

FIG. 2 illustrates a client server system for communication of compressed images. Referring to FIG. 2, server 202 typically has the entire image, or at least is providing access to the portions of the image that it has. These images are stored as JPM files in memory 232. Server 202 is connected over some sort of network, or other communication channel, to at least one client, such as client 201. In one embodiment, client 201 is a "program" controlled by a human user, such as user 250. In an alternative embodiment, client 201 comprises an automated system.

Client 201 issues requests, such as request 210, for some subset of the image and receives responses, such as response 211, containing compressed image data that corresponds in someway to the request. Because of network bandwidth, the resources of server 202, or the structure of the file requested, client 201 might receive more or less data than the portion of the image requested. Client 201 typically issues additional requests for different portions of the image and receives more coded data that augments the previously received data.

Client 201 stores the different portions of the image in cache memory 221. A JPM decoder 222 has the capability of decoding the different portions of the JPM files stored in cache memory 221, individually or together, to generate rendered image 223. Server 202 stores a client cache model 231 that is a model of cache 221 of client 201 to indicate to server 202 which portions of the image that client 201 already has.

Figure 3:
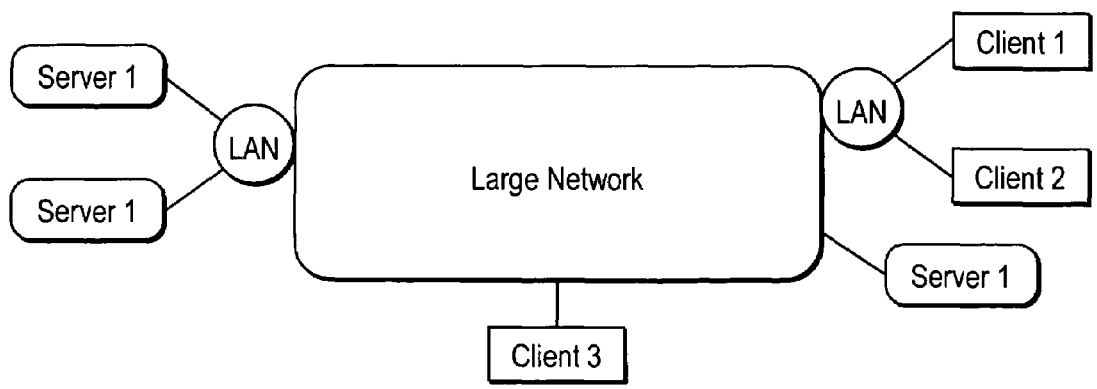
FIG. 3 illustrates an exemplary network.

FIG. 3 illustrates an exemplary network. An exemplary network typically has multiple clients and multiple servers. A single server may serve different portions of the same image to millions of different clients. A single client may receive images and other data (e.g., HTML pages) from several servers. Proxy servers may be in the network to allow quick responses to some requests without the need to contact the original server. The bandwidth available and the bandwidth cost may vary widely between different clients and the same server, or between different servers.

The most commonly used network is the Internet or worldwide-web (WWW) but the techniques described herein can be applied on local area networks (LANs) or any general interconnection system. Likewise, in one embodiment, the compressed documents are transported "on top of" the Hyper Text Transport Protocol (HTTP). However, the techniques described herein are usable with other transport protocols including, for example, TCP/IP and UDP. Some of the techniques are described in terms of HTTP, but could easily be modified to other protocols.

Figure 4:
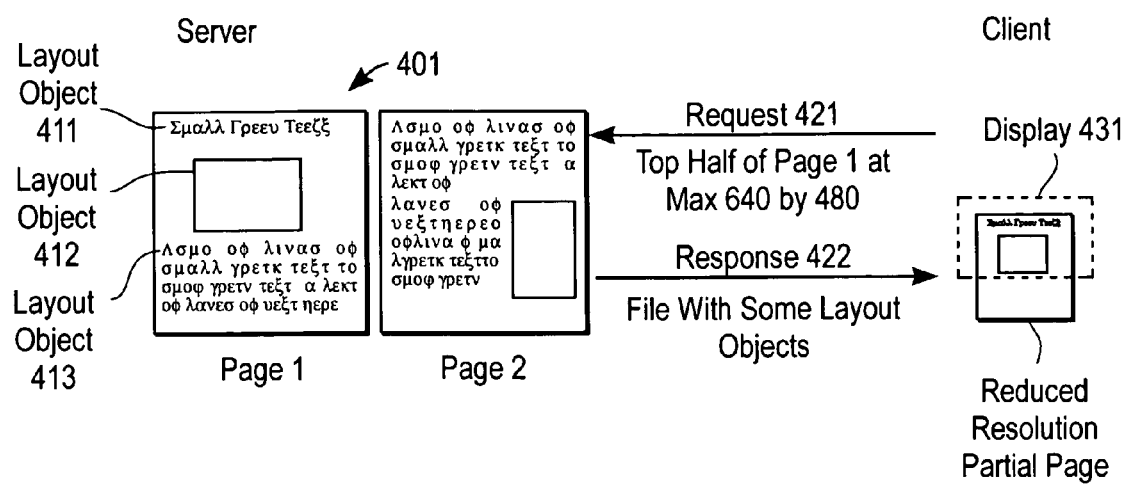
FIG. 4 illustrates a document image with layout objects, parsed for display.
Figure 5:
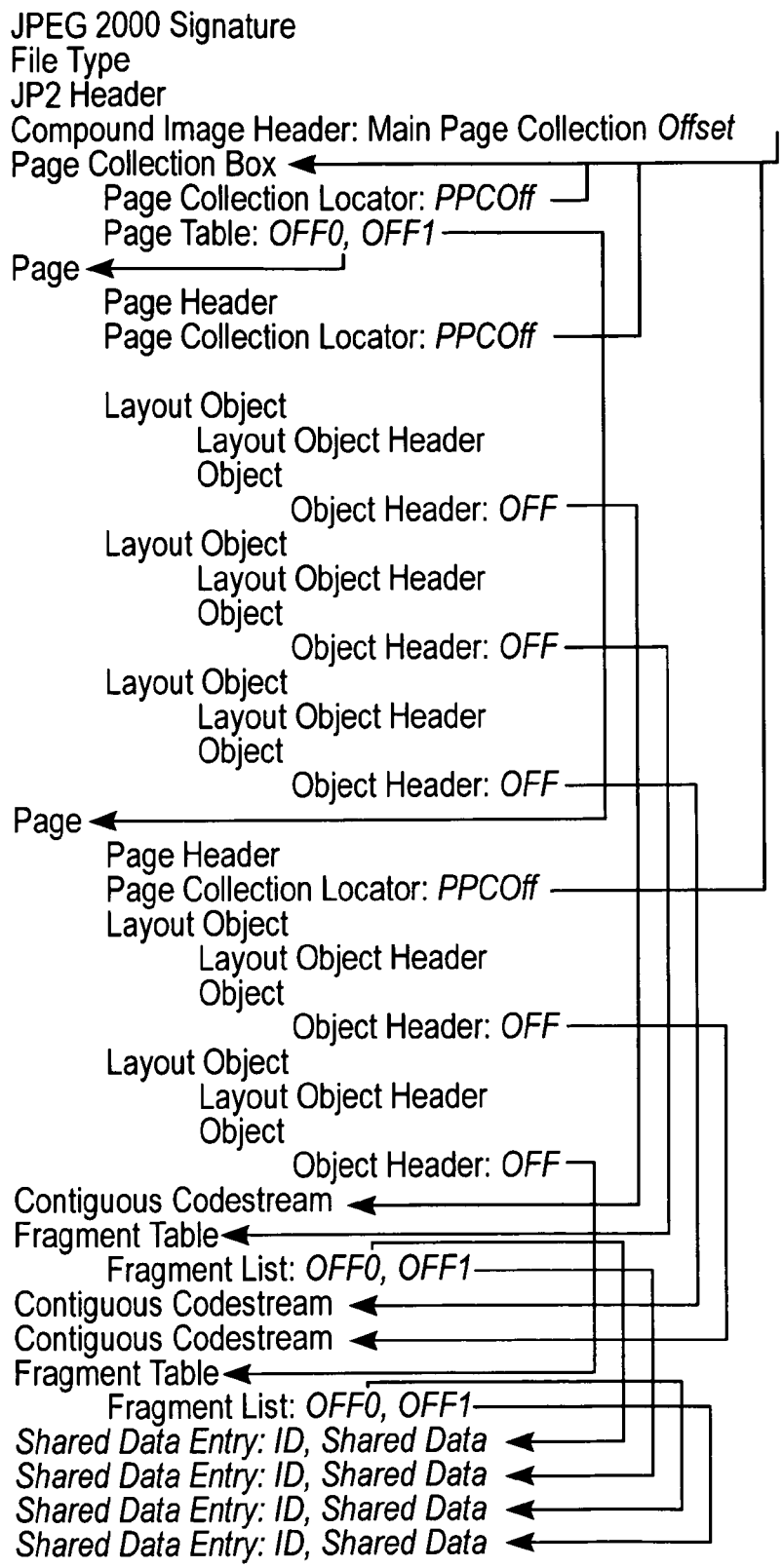
FIG. 5 illustrates a JPM file as a list of boxes with pointers.

FIG. 4 illustrates a two page compound document, a request and a response. Referring to FIG. 4, the two-page document 401 is stored on a server. Page 1 of document 401 has three layout objects 411-413. The client may not want all of document 401, particularly if document 401 is larger than the available display size that the client has. For example, the client may be a personal digital assistant (PDA) with a limited display size and may only want the top half of the page 1. Therefore, the client sends a request 421 for the top half of page 1 at a maximum resolution of 640×480. Note that request 421 does not specify layout objects. In response thereto, the server generates response 422 that includes a file with some layout objects and sends response 422 to the client. Thus, the server determines which layout objects are pertinent to the request. This enables the client to generate an image for display 431 with a reduced resolution corresponding to a partial page.

Techniques for Partial JPM Delivery

A number of techniques may be used for delivering a portion of a JPM file. The delivery is done in response to a request from a client and is performed by a server accessing the portion of the JPM file and sending that portion to the client. The following describes exemplary request syntax(es) for requesting partial documents, exemplary organization(s) of a JPM file on a server, and an exemplary return type(s) for the response from the server.

Request Syntax for Partial Documents

There are several possible techniques for a client to request portions of a compressed document stored in the JPM format. Several of these are described below, however, the techniques of returning partial documents do not depend on the syntax for making a request. It is simply assumed that there is a way to request a portion of the document. In one embodiment, items that might be specified by a request syntax include: desired pages, desired regions on a page, desired resolution for the returned data, a desired method to receive the returned data, and possibly data which has already been received.

JPEG 2000 Part 6 Annex E

The JPM standard includes an Annex called "Guidelines for Construction URLs for JPM Files." This annex provides a set of examples to identify sub-elements of a JPM file. The complete set of examples provided in the JPM standard Annex E are:

foo.jpm?page=3&obj=32
foo.jpm?page=43&type=meta
foo.jpm?page=77&obj=19&type=meta&index=1
foo.jpm?page=91&type=meta&mtype=text
foo.jpm?label=album.html
foo.jpm?label=IPR-info&type=meta&index=2
foo.jpm?coll=toc
foo.jpm?coll=main
foo.jpm?coll=list-of-figs
foo.jpm?coll=list-of-tables
foo.jpm?coll=toc&page=31
foo.jpm?coll=main&page=7
foo.jpm?page=7
foo.jpm?
foo.jpm?page=3&type=img
foo.jpm=3&type=thumb
foo.jpm?off=12384&len=1024

All of the examples above are used to access a portion of the file named "foo.jpm".

The syntax in this annex is the "name=value" type common with http requests today. The elements of this syntax are: page, obj, type, index, mtype, label, coll, off, and len.

"Page" refers to a page number within the main page collection, or one of the other page collections if a "coil" parameter is used.

"Obj" refers to a layout object on a page.

"Type" allows returning metadata or image data for an object.

"Index" allows an item other than the first to be returned. In one example, the 2nd meta data box with label "IPR-info" is requested.

"Mtype" specifies different types of metadata that might be returned.

"Label" refers to the label boxes that can be used within some of the other boxes in a JPM file. This allows access if the client does not know a page number or position in a file, if the label of something is known. For example, the label might say "Figure" and the client might ask for all of "Figure" and get back any objects that have a label box with the word "Figure" in it. (The layout could be associated with a Page box or an Object box.)]

"Coll" refers to a page collection.

"Off" refers to the byte offset within the file.

"Len" refers to the number of bytes desired at the specified offset.

JPEG 2000 Part 6 Annex E does not specify what should be returned for any of these requests. In one case, it is specifically stated, "The behavior of the decoder here is undefined." Further it is not possible with the syntax described to request a spatial portion of a page, or a lower resolution, or a range of pages, or boxes other than the ones listed. Possible return values for these requests are described below.

Extension of Part 6 Annex E

To make the syntax described in Part 6 more useful, in one embodiment, the syntax is extended in one or more of a number of ways. Using this additional syntax, a client may be able to specify desired content in more ways. The server recognizes this additional syntax and is able to respond to such syntax to supply the requested document data to a client.

In one embodiment, the syntax allows any box type to be requested. This may be important because obtaining any box type is useful to access particular codestreams used within a page for example. More specifically, in one embodiment, a "boxtype" parameter is added as a way to generalize the current "page" and "coll" parameters described above. The value for "boxtype" may be any four-character type field for a box. Non-printable characters could be extended in the typical method for URLs. For example, special "non-printable" characters can be replaced with % xx where xx is a numerical code for the particular character.

Because many references in JPM files are by offset into a file, it is useful to be able to request a box starting at a particular offset, and get the entire box. In one embodiment, to do this, the "len" parameter is allowed to take on the special value "boxlength" as in "len=boxlength." In this case, the box starting at the offset specified in the "off" parameter of the request is provided.

Because devices with small displays may want low resolution versions of a document or only some portion of the document, in one embodiment, parameters are included to specify these versions or portions. The "fsiz", "rsiz", and "roff" parameters used in JPIP may be included and used for this purpose. The "fsiz" parameter is used to specify the size of a full page should take on the display device. The "rsiz" and "roff" parameters are used to indicate the portion of the image requested within the page. For example, a handheld display with a 240×320 screen desiring to view only the upper right corner of a page might specify "fsiz=480,640&rsiz=240, 320&roff=240,0".

In one embodiment, the "index" or "page" parameters include extensions to support ranges. This would allow the more than one page to be accessed as a time. For example, the requests foo.jpm?page=1-5
foo.jpm?page=1&type=meta&index=1-5 could be useful.

The latter request tells the server to provide the data in meta data boxes 1-5 for page 1.

In one embodiment, the "boxtype" (or "page" or "coll" or "obj") parameter is extended to include sub-boxes. For example, "boxtype=page/BCLR" could specify the Base color sub-box of the Page box.

JPIP (JPEG 2000 Part 9)

JPEG 2000 Part 9 specifies an extensive syntax with over 30 "name=value" parameters defined to return portions of a JPEG 2000 codestream and meta-data. For example, JPIP provides a parameter called "subtarget" that allows a JPIP server to apply the request for a particular region to only a portion of the file. For JPM, this could be used to request part of a JPEG 2000 codestream from inside a JPM file. For example, a client that has received a Page box and the associated Object boxes can use the offset field from the Object box to request only a portion (e.g., the upper left corner) of a JPEG 2000 codestream pointed to by the offset field of the Object box. For example, a URL like "foo.jpm?subtarget=133224-&fsiz=1024,1024&rsiz=512,512&roff=0,0" requests the upper left corner of the codestream starting at byte offset 133224 of the file foo.jpm to be delivered with sufficient resolution to create a full image of the object with 1024 by 1024 samples.

In one embodiment, a client uses a "stream" parameter of JPIP with either an integer value or a "scope-token" to specify a particular codestream for a particular image on a particular page. The "scope-token" is reserved for ISO definition, but could allow a request to be issued for the codestream associated with "page 5, layout object 3, image" if defined appropriately.

One disadvantage of the JPIP request syntax is that requests for a region and resolution apply to a single codestream rather than a page. If the top half of a page is desired, and a codestream only appears on the top half of the page, then data in the JPM for the whole image of that codestream should be returned by the server, rather than just the top half of the codestream. Assuming the client has the Page box, then a request can be created to obtain the correct portion of each codestream on the page. JPIP does not support non-JPEG 2000 codestreams, while JPM makes use of JBIG, JBIG2 and other compression standards.

Extension to JPIP for JPM

To make the JPIP syntax more useful for document images, it could be extended.

In one embodiment, the JPIP syntax is extended to add a "page" request parameter to work along with the parameters describing the region. When the "page" parameter is used, the "fsiz", "rsiz", and "roff" parameters apply to the page, not the individual codestreams within the page. The server could thus take a request for the page, and convert it appropriately to the desired regions of objects on the page.

Other Possible Syntaxes

Of course there are many possible request syntaxes. Some combination of the syntax suggested in JPEG 2000 Part 6 and that in JPEG 2000 Part 9 may be used. Also, an XML-based syntax may be used for accessing portions of images. This might be based on the JPIP syntax but arranged as legal XML. This could be useful for "web services" which could become a common way to provide partial document access.

The techniques described herein for returning portions of a JPM file do not depend on the exact syntax used for requests.

Organization of JPM File on a Server

There are many ways to store a compound document using JPM files that allow exactly the same complete document to be decoded. These differences have to do with the order of information in the file, the use of alternative box types that can accomplish similar purposes, the use of external files, and the assignment of pixels to different layout objects, etc. Each of these variations can impact the overall decode speed of a particular decoder, the ease of finding part of a document, the total file size, and other factors. Some particular choices of file. arrangement benefit client server operations.

External File storage

Codestreams which are decoded to form mask or image objects can be stored inside a JPM file in a Contiguous Codestream box or in a Media Data box, or in Shared Data Entry boxes. Codestreams can also be stored in files outside of the JPM file. Because the JPM file can indicate that a codestream is in another file, at some offset in that file, the codestream can be wrapped in a variety of ways. The codestream could be in a JP2 file, the codestream could be in a file with a collection of other codestreams but no header data at all, or the codestream could be the only contents of the external file. One advantage of storing the codestreams in the JPM file is that they will not be separated from the file by typical file system operations, like copying. Also it is possible to get the entire document with a single request if it is stored as a single file. Some advantages of storing codestreams externally are that the codestream can be shared between multiple documents, e.g. a company logo or letterhead need only be stored once.

Furthermore, with external storage, it is possible to request the codestream in many ways. Some requests on a JPM file which points to the codestream in a separate file may cause the file to be returned. Alternatively, a client could directly request an external file. External file storage also makes it possible to protect different portions of the compound document differently. For example, some clients might not be given permission to access some files, or some files might be encrypted.

Fragment Tables vs. Contiguous Codestream Boxes

Another choice a server can make when storing a codestream is to store the file in a Contiguous Codestream box, or to point to the codestream with a Fragment Table box. The use of a Contiguous Codestream box is the simplest approach because the codestream is all together. This may be good for a server because it will not need to look to many different places in the file (or even other files) in order to access the codestream. Using the Fragment Table box however, allows the codestream to be stored externally, and allows the codestream to be divided even if it is stored within the JPM file. The codestream can be divided into portions that are commonly accessed together. The divisions could even be given some typical meaning, e.g. the first fragment is low resolution, the second fragment is medium resolution, and the last fragment is high resolution.

Storage of Codestreams in Shared Data Entry Boxes

Codestreams that are addressed using a Fragment Table box could be at any offset in any file. If they are in a legal JPM file, then they could be stored in a Media Data box, a Free box, a Shared Data Entry box, and a Contiguous Codestream box. Codestreams could even be hidden in other box types, e.g. Label boxes, XML boxes, UUID boxes, or even auxiliary Page boxes, but this is not recommended as it may cause problems for some JPM decoders. The most typical storage is probably a Media Data box and a particular codestream could appear in one or many Media Data boxes. Storing a codestream in a Free box may be useful if the codestream is not essential for decoding the image. An editor that doesn't realize the Free box contains useful information may discard it. Storing a codestream in a Shared Data Entry box rather than a Media Data box is probably useful only if some meaning is assigned to the index.

There are benefits to using numbers for fixed meaning. For example, an index may be assigned to each Shared Data Entry box. Then, the decoder may go through the JPM file and remove some of the boxes and leave others in the file based solely on the index number without decoding any information within the Shared Data Entry box.

Return Type

One Time Full Image Returned

In one embodiment, a client receives a response to a request for part of an image by receiving a complete compressed image that can be decompressed and displayed as the answer to the request.

In the extreme, a server could decompress the complete document image in memory, reduce it to the number of pages, region, and resolution desired by the client, recompress the image (either as a JPM file or as some other format like JPEG or PDF), and transmit it to the client. Although this method allows backward compatibility with old decompressors on the client, it has several disadvantages. It is an extremely high computational burden on the server (one full decompression, one partial compression). Also, it does not take advantage of the features of a JPM file. Furthermore, it is not efficient, in the sense that a follow-on request with much overlapping image data will lead to retransmission of some of the same coded data. However, it is a very simple approach that is beneficial.

An approach that still makes things easy on the client is for the server to "parse" the full JPM file and collect all the boxes that are relevant for the client's particular request. No image data is decoded, but unnecessary pages, codestreams, including high resolution parts of codestreams, are discarded before transmission. In order to make an easily decodable file, the server takes the pieces that need to be transmitted and forms a new JPM file by adjusting any references to the new location in the file and eliminating all pointers to external files. Page counts and the number of objects on a page can be adjusted to only those pages and objects needed to fulfill the clients request.

Forming a new JPM file for a request still allows a very simple action by the client, namely, decoding the received file. Further, portions of the returned data may be useful for subsequent requests as will be seen.

New JPM File for Each Request

Figure 6:
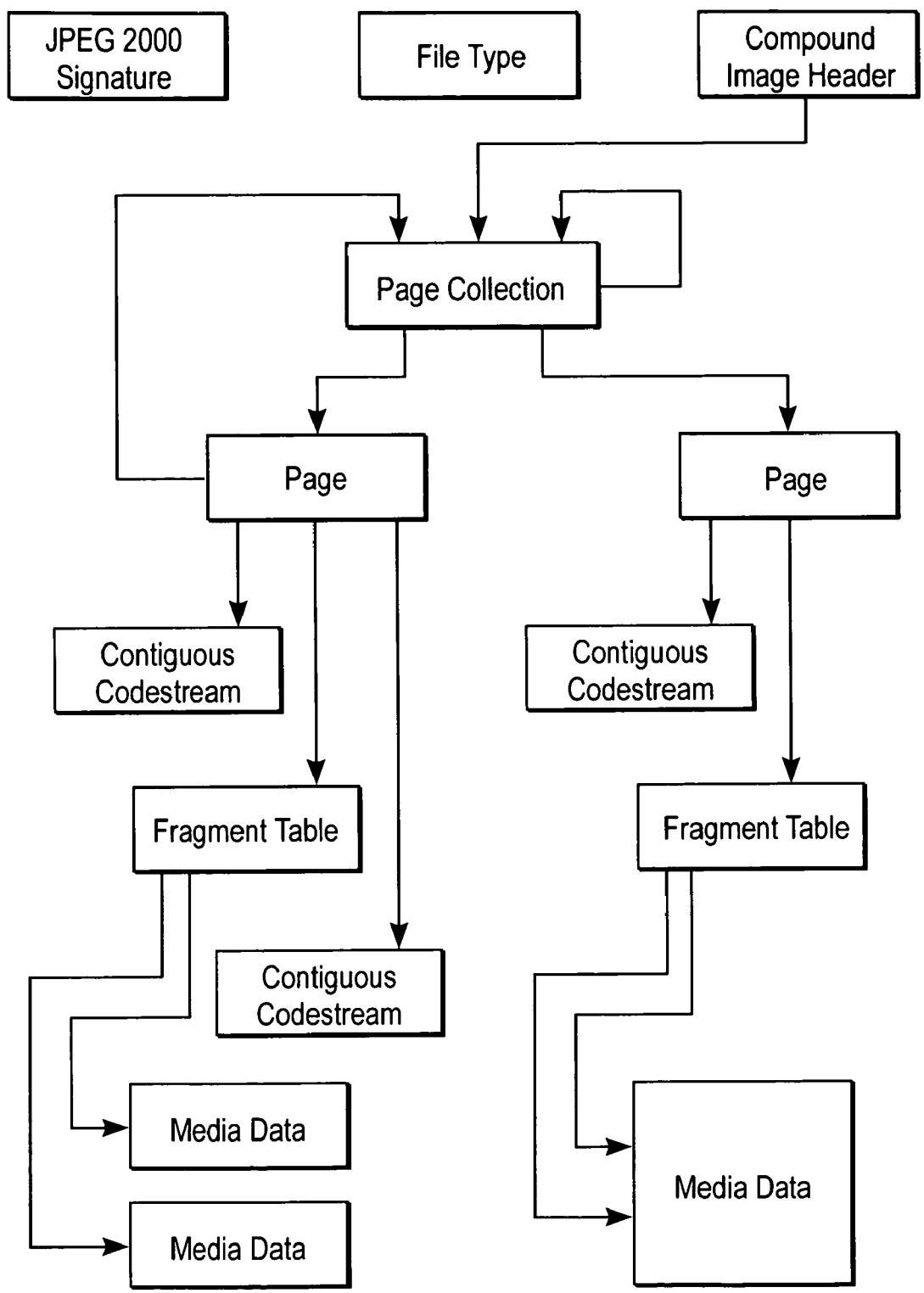
FIG. 6 illustrates the major file structure of one JPM file.
Figure 7:
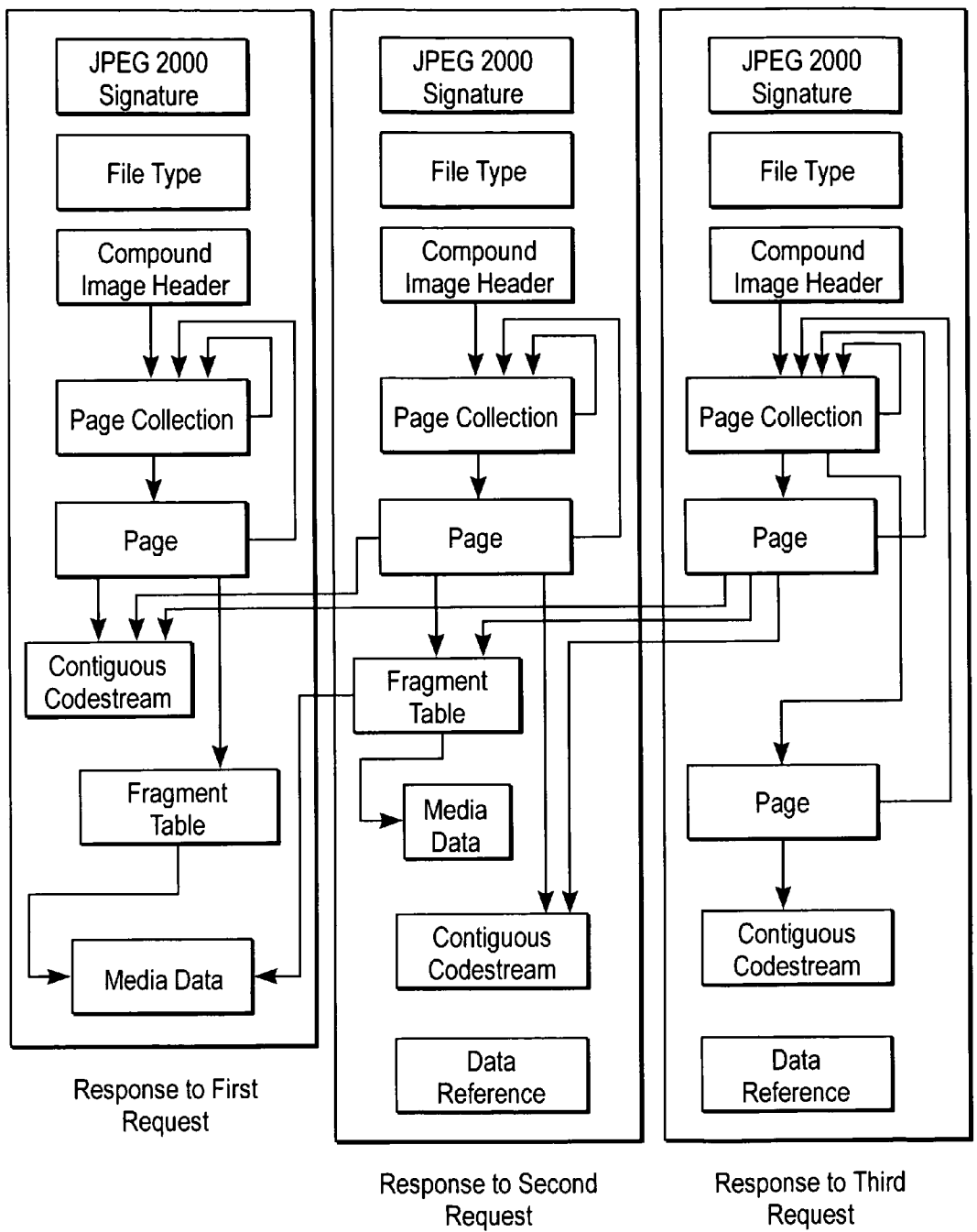
FIG. 7 illustrates interactive access with multiple JPM files with contained codestreams.

FIG. 7 shows three different files drawn in the same manner as FIG. 6 that a client might receive in response to three requests. The first file a client receives in response to the first request is a completely self-contained JPM file shown on the left of FIG. 7. After making a follow-up (second) request for more data, the client receives a second JPM file, which is shown in the center of FIG. 7. This file contains a repeat of some of the boxes from the first file. In this case, the JPEG 2000 Signature box, File Type box, Compound Image Header box, and Page Collection box are repeated. However, the Page box in the new file contains pointers to three objects instead of only two. The first codestream addressed by the Page box is stored in the JPM file the server previously sent to the client. Offsets to other files require a Data Reference box to be somewhere in the top level of the file and this is shown at the bottom of the middle of FIG. 7.

The second JPM file makes use of the portion of the codestream sent in the first response; however, it extends that codestream by including additional data in a Media Data box in the current file. Thus, the Fragment Table box addresses one fragment from the previous response, and one from the current file.

When a third request is made, a third response consists of a new JPM file. This file makes use of both of the previously received files and again include still more information. In the example shown in the right side of FIG. 7, the first Page box makes use of data previously sent, while the second Page box contains a new codestream. This would be typical if the user was scrolling from one page to the next.

Note that while FIG. 7 appears to repeat a lot of boxes from one response to the next, and only make use of a few previously sent boxes, the boxes being repeated are relatively small. The JPEG 2000 Signature box, File Type box, Compound Image Header box, Page Collection box, and Page box can be sent with at most a few thousand bytes. The Contiguous Codestream boxes and Media Data boxes, which are not repeated, may be millions of bytes for some images. Thus, even if the whole file is ultimately sent, there is only a small overhead for providing interactive access and access to the portions of interest is much more efficient.

Figure 8:
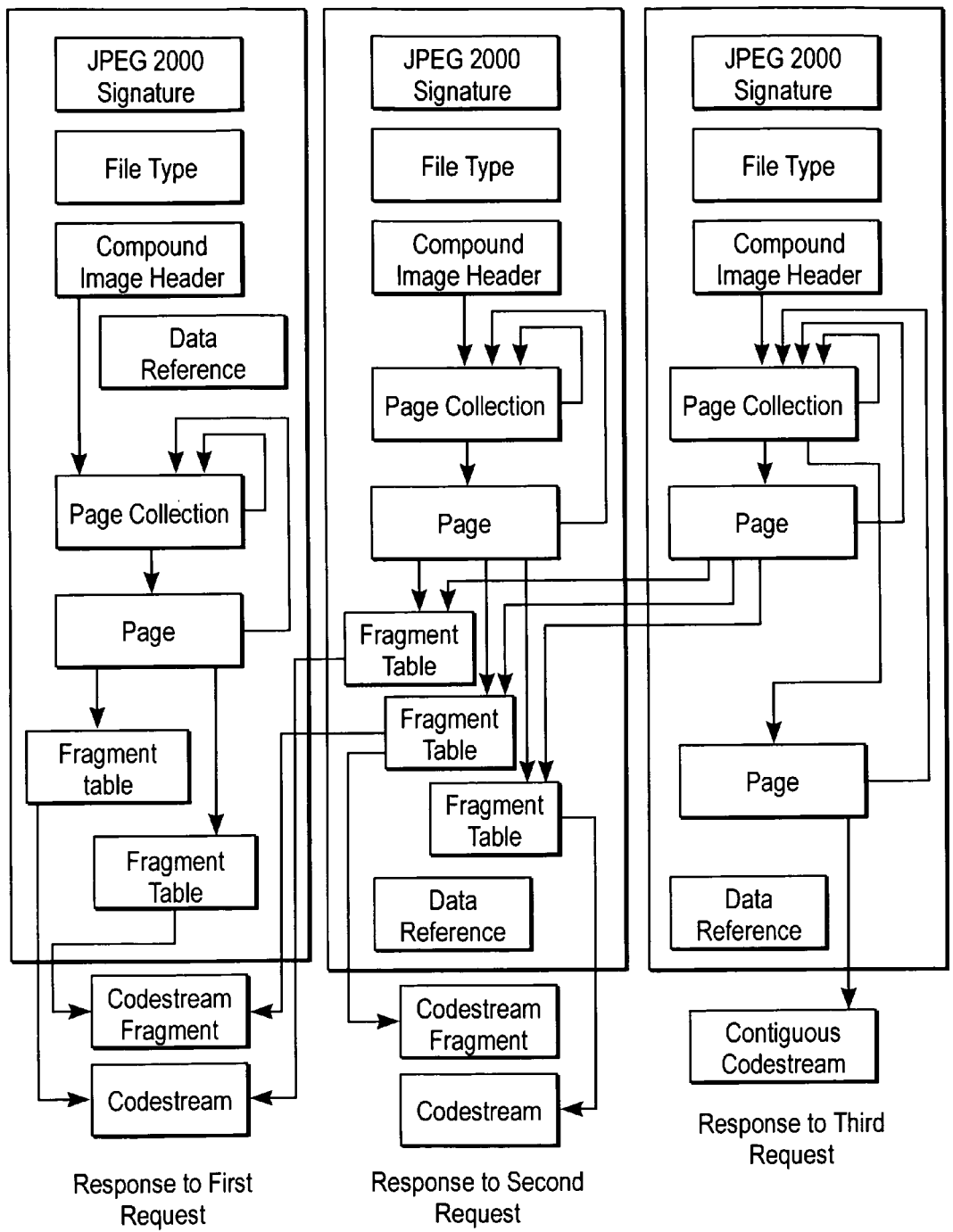
FIG. 8 illustrates interactive access with multiple JPM files with external codestreams.

Although full image responses are typically considered to be "stateless" in the sense that the server need not maintain a cache model (231 in FIG. 2), the full image returns shown in FIGS. 7 and 8 benefit from the server maintaining information about the client's previous requests and the server's previous responses. To be efficient, the server needs to keep track of the location of any data in the file to which the server might refer that was sent in previous responses. In one embodiment, the server keeps track of the location of codestream fragments (or complete codestreams). Additionally if the server plans to make use of previous page tables or fragment tables, their location should be tracked as well. The server might not keep track of these locations individually; instead, if the server uses consistent methods for generating a response, it could keep track of the request, and the size of the response previously sent. Then, when a later request was made, the server could determine how it would have responded to previous requests. This allows the server to determine the locations of items that will be referred to in the current request.

In one embodiment, there is an agreed upon convention for the server to be able to refer to files stored on the client. This convention could be established by a standards committee or by de-facto standard. In the absence of an agreed convention for referring to files on the client, the server may use the URL the client used for the previous request. If the previous request was marked as cacheable, a smart client will not generate it again. In one embodiment, if the client does issue the request again, the same data is returned and the decoding still works, it will just be inefficient because of retransmission of data.

Full JPM File Returned—Codestreams Stored Externally

Rather than include codestreams in the JPM files as in FIG. 7, codestreams may be kept in external files. The file on the server might be stored with the codestreams outside of the JPM file. Returning a JPM file that points to these codestreams is easier than combining them with the JPM file.

Given a particular request, a server could return both the JPM file which points to external codestreams and portions of the codestreams appropriate to the request. In this case, the return type consists of multiple files. In HTTP, the "Content-type:" could be multi-part MIME. That is, both the JPM files and the external codestreams could be wrapped together and sent as a MIME file. In one embodiment, the client stores the received files and, when a decode operation is issued, accesses the local codestreams at the resolution provided by the server. The advantage of this method is a single request yields the desired result. The disadvantage is the use of a multi-part response, and difficulty in extending the received codestreams to other regions. One response with a JPM file and two codestream fragments is shown on the left of FIG. 8.

FIG. 8 shows three responses to three interactive requests. In this case, all codestreams are stored externally from the JPM file. The first response needs to address two codestreams, so there are two Fragment Table boxes in the JPM file, each addressing a different external codestream. After receiving a full image return with external files as described above, a client may issue a follow up request. For example, a client might scroll down a page and require new layout objects that were originally skipped because they had no intersection with the first requested region. A response to a follow up request is shown in the middle of FIG. 8. In this case, the response is a new complete JPM file. This file contains more layout objects than the first request. The file, however, refers to the same codestreams used by the first request. Because they were returned with the previous request, the client should still have them in it's cache (221 in FIG. 2). There is no need to use any of the boxes in the previous JPM file although externally stored codestreams are reused. Because the codestreams are typically much larger than the addressing information, sending new JPM boxes is not inefficient.

In one embodiment, if a third request is made this time for a new page, a new JPM file is returned as a response. This time the JPM file contains an additional page and points to external codestreams needed for that page. This is shown on the right hand side of FIG. 8. The third response is also a JPM file, again addressing codestreams from previous responses. In this case, the first page box makes use of the fragment table boxes from another JPM file, but the response could have included the fragment table boxes directly and avoided any need for the second JPM file.

Note that there are multiple ways for the codestream to be stored in external files. A codestream could be stored as a whole codestream by itself in a file. The codestream could even be scattered over several different files with just a part of the codestream in each file. The codestream could be stored in a JP2 file. In this case, the Fragment Table box in the JPM file points partway into the JP2 file where the codestream appeared. Alternatively, the Page Table box in the JPM file could point to the Contiguous Codestream box in a JP2 file. There could even be a file that contained only a Contiguous Codestream box and the codestream, but no other boxes. This would allow the JPM Page Table box to point to offset 0 of the file. The disadvantage of a Contiguous Codestream File box is that it would not be recognized by itself by most JPEG 2000 codecs.

One File External Pointers

Instead of returning the external codestreams with the JPM file in a multi-part response, in one embodiment, a server returns only the JPM file with external references to the needed codestreams on the server. The client then issues separate requests directly on each codestream. The requests on individual codestreams could be byte-range requests for JBIG and JBIG2 codestreams, and JPIP requests as specified in JPEG 2000 Part 9 for JPEG 2000 codestreams. This multiple request structure allows very fine grain control by the client over the data received. It is definitely more complex for the client than just getting back a single self contained JPM file, and it requires multiple round-trips, which might delay the receipt of data.

In another alternative embodiment, a server does not remove any pages or layout objects from a page, but changes references for objects that aren't part of a request to point to the file on the server, while objects that are included point locally. Thus, a client after receiving the first response is aware of the number of pages, and the extent of the JPM file and has a locally decodable file for the requested portion.

Figure 9:
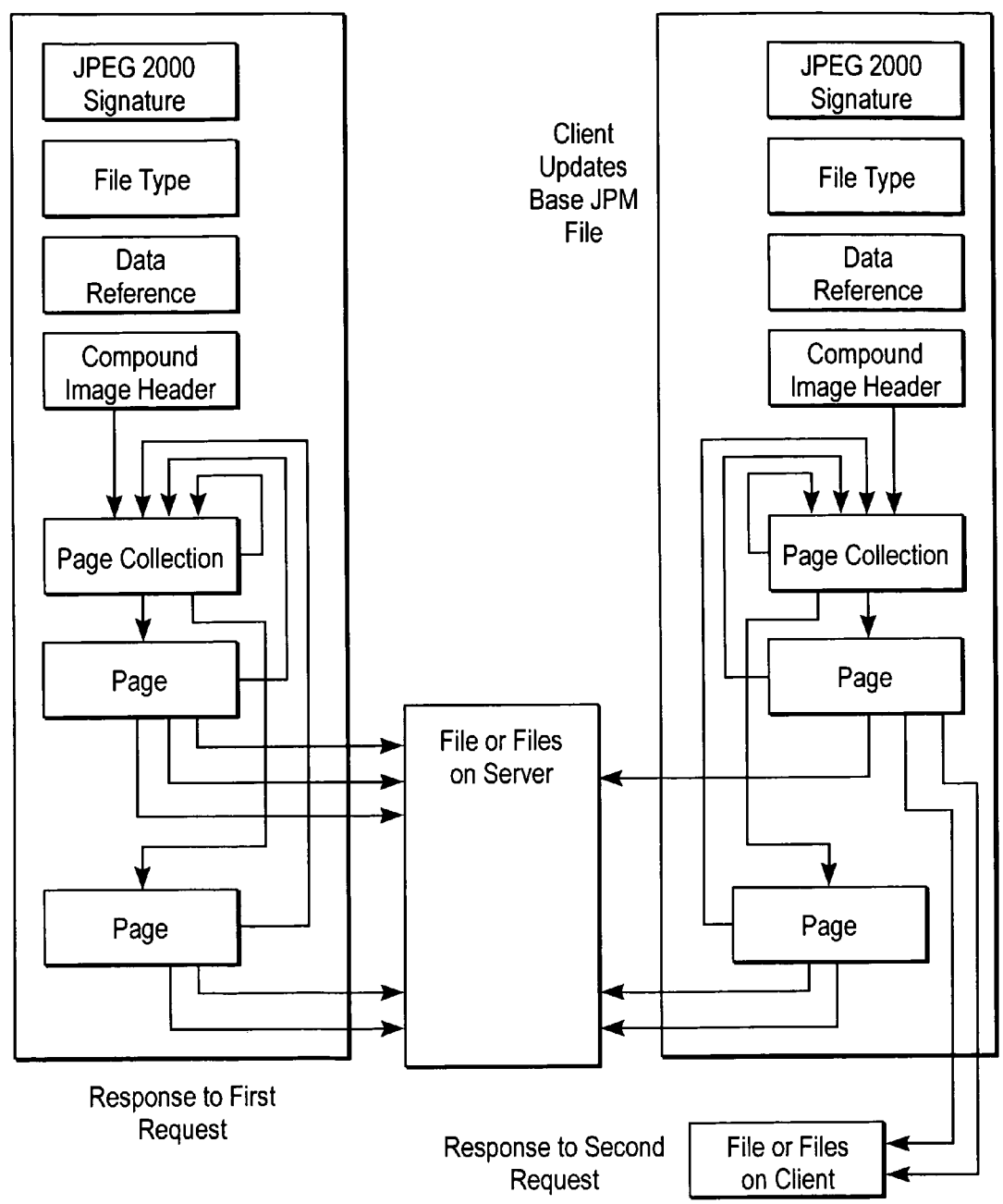
FIG. 9 illustrates interactive access with one JPM file and external codestreams.

FIG. 9 shows a JPM file that might be returned in response to a request. In this case, the JPM file is "complete" in the sense that it contains boxes for all pages and layout objects in the document. All of the codestreams are still located on the server. If a client makes a request for more data, it may receive some of the codestreams or even complete codestreams. These are then stored locally. The client can update the JPM file previously received so that it points to the codestreams that are available locally. The JPM file continues to be a legal file representing the whole document, but with some codestreams available locally and some remaining on the server.

One File Partially Returned

Figure 10:
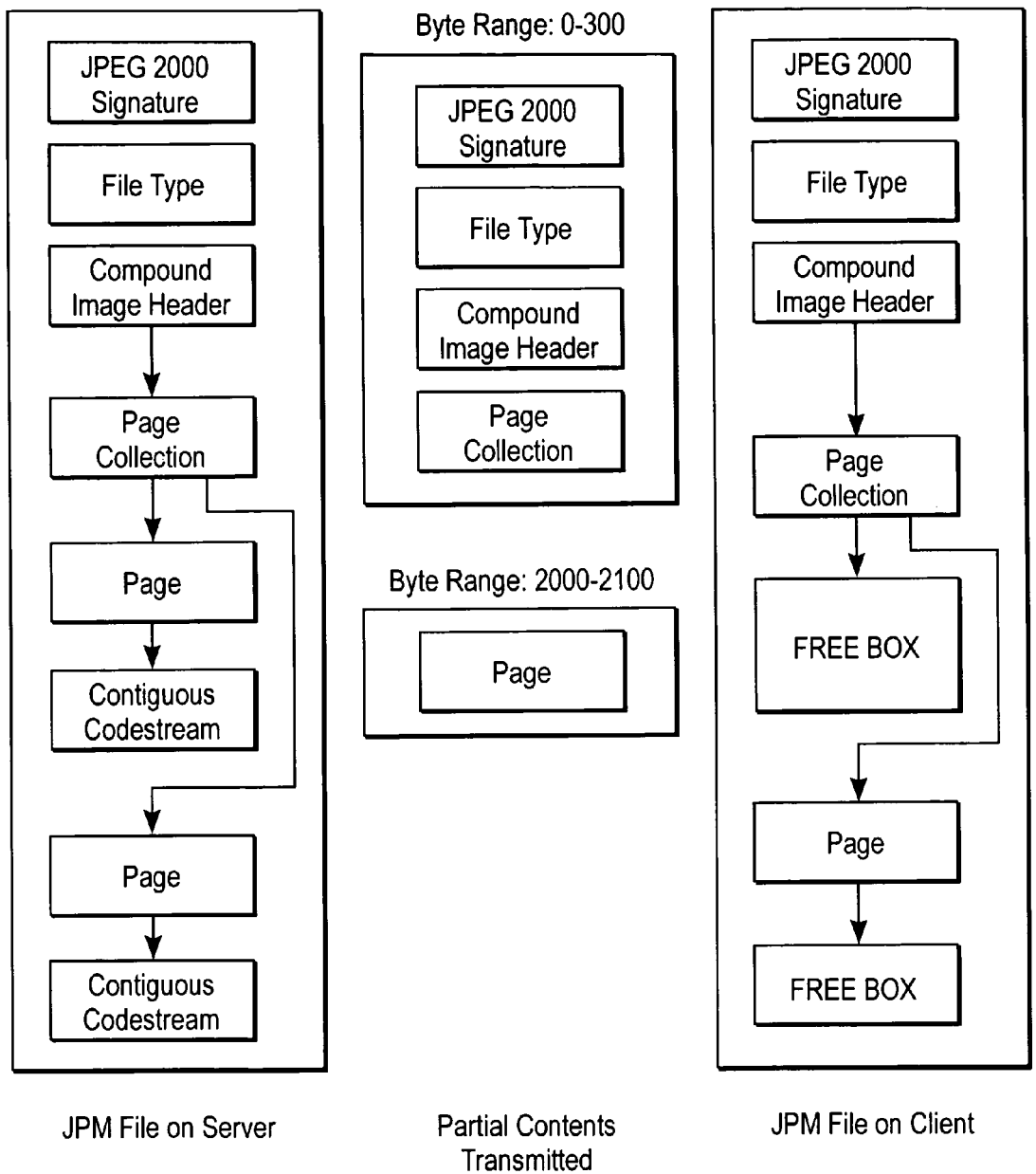
FIG. 10 illustrates interactive JPM access with parts of the file transmitted using byte ranges.

Rather than adjusting the pointers in the returned JPM file, in one embodiment, a server returns parts of a JPM file, with the portions returned identified. An example of one JPM file sent in portions is shown in FIG. 10. Referring to FIG. 10, there is a complete file on the server as seen on the left side of FIG. 10. Based on the request, the server selects portions of the file and sends them to the client identifying the portions sent. These portions are shown in the $2^{nd}$ column of FIG. 10. The identification of the portions could be done with an HTTP response indicating partial content and the byte ranges of the returned boxes. To make use of a file returned in this way, the client keeps track of what parts of the file have been received and which are still missing. In one embodiment, shown in the right column of FIG. 10, the client does this by filling the gaps in the file with "Free boxes." When additional data is received the size of the free boxes are adjusted or the free boxes are eliminated entirely. As long a the server returns all the boxes and codestream portions needed for a request, a standard JPM decoder may be able to run on the file and decode the region requested. Ideally, the decoder should be aware that the file may have "holes" because boxes outside of the region requested will not be sent and there may be pointers in the file that point to non-existent data. The client is able to eventually accumulate the entire file available from the server.

Media Data-bins and Placeholders

Figure 11:
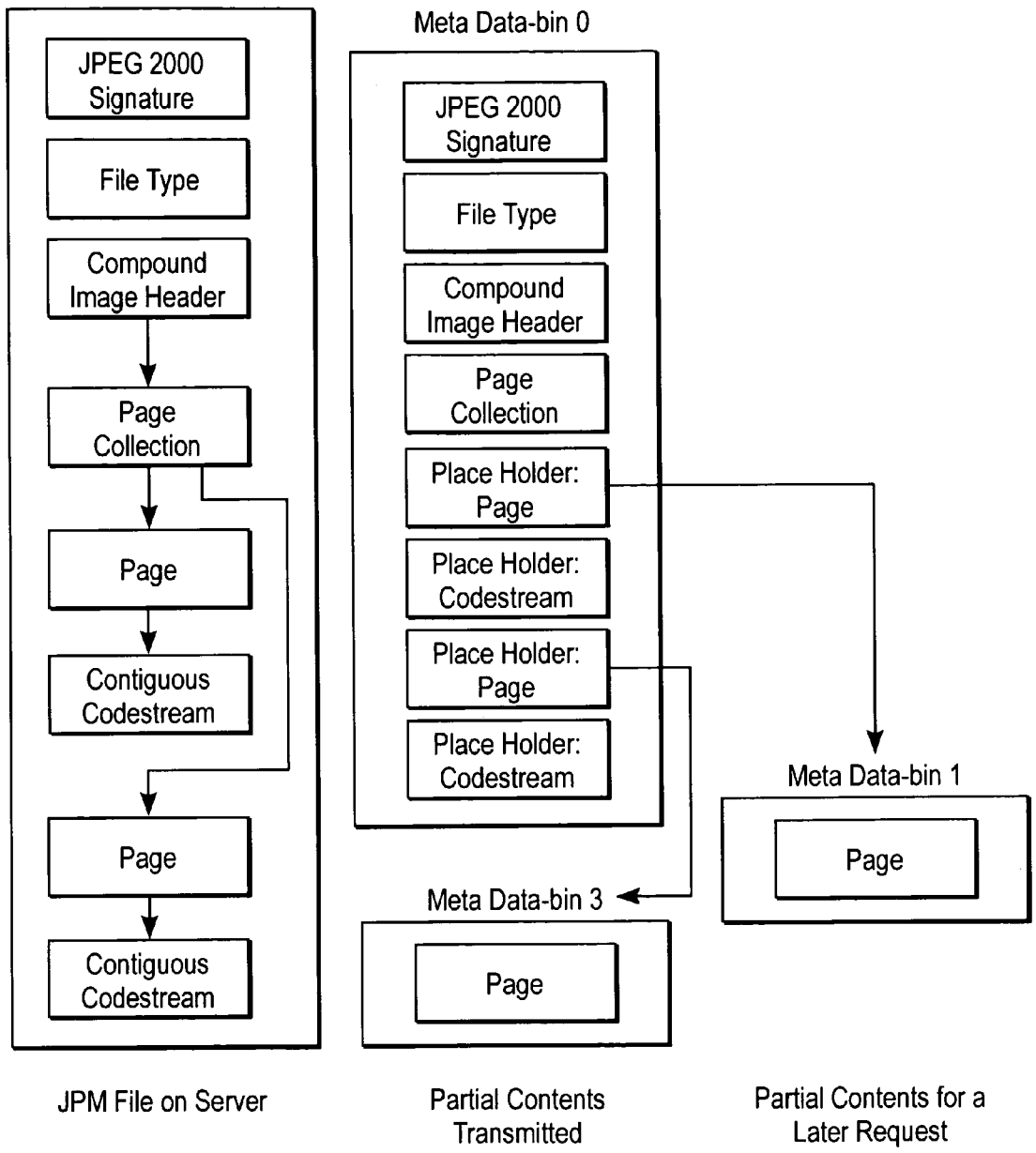
FIG. 11 illustrates interactive JPM access with meta data-bins.

The JPIP standard defines meta data-bins as a way of returning file format boxes inside of JPP-streams and JPT-streams. To use meta data-bins the server may have the same file as used in FIG. 10 and repeated on the left side of FIG. 11. When a request is made, File Format boxes are returned as part of meta data-bins. All boxes appearing at the top level of the file are either in meta-data bin number 0, or there is a place holder box instead of the box in, meta-data bin 0. The "place holder boxes" may be created by the server and might not exist in the original JPM file. Boxes that are replaced by a place holder in meta data-bin 0 appear in other meta data-bins.

The server can choose to send meta data-bins in any order, and might send only the first part of a particular meta data-bin. The client may keep the meta data-bins received from the server and a smart JPM decoder could navigate the meta data-bins by keeping a map of what offsets are in each meta data-bin. The use of meta data-bins and a smart JPM decoder allows the client to avoid storage of a large file with lots of the data labeled as a "free" box. Data for codestreams may easily be intermixed with data for the boxes by mixing tile or precinct data-bins with the meta data-bins.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

The invention claimed is:

1. A method comprising:
receiving, with a processor, a plurality of requests for portions of a JPM file across a network; and
transmitting, with the processor, a JPM file in parts across the network in response to the plurality of requests, wherein each of the parts is a legal JPM file, and
wherein transmitting the JPM file comprises:
transmitting a first legal JPM file corresponding to a first request of the plurality of requests;
tracking items of the JPM file transmitted in the first legal JPM file in response to the first request; and
transmitting a second legal JPM file corresponding to a second request of the plurality of requests without including the tracked items, the second legal JPM file referring to the first legal JPM file.

2. The method defined in claim 1 wherein the portions are selected from a group consisting of one or more desired pages, one or more desired regions on a page, desired resolution for data being returned, a desired technique to receive returned data, and an indication of data from the JPM file that has already been received.

3. The method defined in claim 1 wherein the request is selected from a group consisting of a spatial portion of a page, a lower resolution of a page, a range of pages, and non-label boxes.

4. The method defined in claim 1 wherein at least one of the requests specifies a box type in the JPM file and at least one of the parts of the JPM file includes information stored in one or more of each box of the box type specified in the at least one request.

5. The method defined in claim 4 wherein the at least one request further specifies a sub-box associated with the box type, and wherein the response includes data associated with the sub-box of the box type.

6. The method defined in claim 1 wherein at least one of the plurality of requests specifies a box in the JPM file starting at an offset.

7. The method defined in claim 6 wherein the response returns all of the contents of the box.

8. The method defined in claim 1 wherein at least one of the plurality of requests specifies page size that a page in the JPM file would take on a display and specifies a portion of an image requested within the page.

9. The method defined in claim 1 wherein at least one parameter in at least one of the plurality of requests indicates a range.

10. The method defined in claim 1 wherein at least one of the plurality of requests includes a offset from an object box to obtain a portion of a codestream pointed to by the offset.

11. The method defined in claim 1 wherein at least one of the plurality of requests specifies a frame size, a region offset, ad a region size to identify a portion of a codestream to obtain.

12. The method defined in claim 1 wherein at least one of the plurality of requests includes a page request parameter.

13. The method defined in claim 1 further comprising storing the JPM file on a server using external file storage.

14. The method defined in claim 1 further comprising storing the JPM file on a server with a plurality of codestreams in shared data entry boxes.

15. The method defined in claim 1 further comprising:
collecting boxes in the JPM file relevant to at least one of the plurality of requests;
forming a new JPM file with the boxes that are relevant to the at least one request, including adjusting any references of the boxes to new locations in the file; and
transmitting the new JPM file.

16. The method defined in claim 15 wherein forming the new JPM file comprises eliminating pointers to external files.

17. The method defined in claim 15 where forming the new JPM file comprises adjusting page counts and the number of objects on a page.

18. The method defined in claim 17 wherein adjusting page counts and the number of objects on a page comprises adjusting only those pages and objects needed to fulfill at least one of the plurality of requests.

19. The method defined in claim 1 wherein transmitting the JPM file in parts in response to the plurality of requests comprises transmitting another first JPM file with at least one reference to at least one externally stored file.

20. The method defined in claim 19 wherein the at least one externally stored file comprises at least one externally stored codestream.

21. The method defined in claim 19 further comprising sending another JPM file with references to data in a previously sent JPM file.

22. The method defined in claim 1 further comprising grouping the JPM file with any externally referenced files and sending the grouping in response to at least one of the plurality of requests.

23. The method defined in claim 22 wherein the grouping is a MIME file.

24. The method defined in claim 1 wherein transmitting a JPM file in parts in response to the plurality of requests comprises transmitting the JPM file with changed references for objects that are not part of one or more requests to point to a file on a server without removing pages or layout objects.

25. The method defined in claim 24 further comprising:
sending another JPM file that includes codestream data that extends one or more codestreams in the previously sent JPM file.

26. An article of manufacture having one or more recordable storage media storing executable instructions thereon which, when executed by a system, cause the system to perform a method comprising:
receiving a plurality of requests for portions of a JPM file across a network; and
transmitting a JPM file in parts across the network in response to the plurality of requests, wherein each of the parts is a legal JPM file, and
wherein transmitting the JPM file comprises:
transmitting a first legal JPM file corresponding to a first request of the plurality of requests;
tracking items of the JPM file transmitted in the first legal JPM file in response to the first request; and
transmitting a second legal JPM file corresponding to a second request of the plurality of request without including the tracked items, the second legal JPM file referring to the first legal JPM file.

27. The article of manufacture defined in claim 26 wherein the portions are selected from a group consisting of one or more desired pages, one or more desired regions on a page, desired resolution for data being returned, a desired technique to receive returned data, and an indication of data from the JPM file that has already been received.

28. The article of manufacture defined in claim 26 wherein the request is selected from a group consisting of a spatial portion of a page, a lower resolution of a page, a range of pages, and non-label boxes.

29. The article of manufacture defined in claim 26 wherein at least one of the requests specifies a box type in the JPM file and at least one of the parts of the JPM file includes information stored in one or more of each box of the box type specified in the at least one request.

30. The article of manufacture defined in claim 29 wherein the at least one request further specifies a sub-box associated with the box type, and wherein the response includes data associated with the sub-box of the box type.

31. The article of manufacture defined in claim 26 wherein at least one of the plurality of requests specifies a box in the JPM file starting at an offset.

32. The article of manufacture defined in claim 31 wherein the response returns all of the contents of the box.

33. The article of manufacture defined in claim 26 wherein at least one of the plurality of requests specifies page size that a page in the JPM file would take on a display and specifies a portion of an image requested within the page.

34. The article of manufacture defined in claim 26 wherein at least one parameter in at least one of the plurality of requests indicates a range.

35. The article of manufacture defined in claim 26 wherein at least one of the plurality of requests includes an offset from an object box to obtain a portion of a codestream pointed to by the offset.

36. The article of manufacture defined in claim 26 wherein at least one of the plurality of requests specifies a frame size, a region offset, and a region size to identify a portion of a codestream to obtain.

37. The article of manufacture defined in claim 26 wherein at least one of the plurality of requests includes a page request parameter.

38. The article of manufacture defined in claim 26 wherein the method further comprises storing the JPM file on a server using external file storage.

39. The article of manufacture defined in claim 26 wherein the method further comprises storing the JPM file on a server with a plurality of codestreams in shared data entry boxes.

40. The article of manufacture defined in claim 26 wherein the method further comprises:
    collecting boxes in the JPM file relevant to at least one of the plurality of requests;
    forming a new JPM file with the boxes that are relevant to the at least one request, including adjusting any references of the boxes to new locations in the file; and
    transmitting the new JPM file.

41. The article of manufacture defined in claim 40 wherein forming the new JPM file comprises eliminating pointers to external files.

42. The article of manufacture defined in claim 40 wherein forming the new JPM file comprises adjusting page counts and the number of objects on a page.

43. The article of manufacture defined in claim 42 wherein adjusting page counts and the number of objects on a page comprises adjusting only those pages and objects needed to fulfill at least one of the plurality of requests.

44. The article of manufacture defined in claim 26 wherein transmitting a JPM file in parts in response to the plurality of requests comprises transmitting another first JPM file with at least one reference to at least one externally stored file.

45. The article of manufacture defined in claim 44 wherein the at least one externally stored file comprises at least one externally stored codestream.

46. The article of manufacture defined in claim 44 wherein the method further comprises sending another second JPM file with references to data in a previously sent JPM file.

47. The article of manufacture defined in claim 26 wherein the method further comprises grouping the JPM file with any externally referenced files and sending the grouping in response to at least one of the plurality of requests.

48. The article of manufacture defined in claim 47 wherein the grouping is a MIME file.

49. The article of manufacture defined in claim 26 wherein transmitting a JPM file in parts in response to the plurality of requests comprises transmitting the JPM file with changed references for objects that are not part of one or more requests to point to a file on a server without removing pages or layout objects.

50. The article of manufacture defined in claim 49 wherein the method further comprises:
    sending another JPM file that includes codestream data that extends one or more codestreams in the previously sent JPM file.

51. An apparatus comprising:
    an input to receive a plurality of requests for portions of a JPM file stored in a storage medium across a network; and
    a server core, coupled with the input, to transmit a JPM file in parts across the network in response to the plurality of requests, wherein each of the parts is a legal JPM file, and
    wherein to transmit the JPM file, the server core:
        transmits a first legal JPM file corresponding to a first request of the plurality of requests;
        tracks items of the JPM file transmitted in the first legal JPM file in response to the first request; and
        transmits a second legal JPM file corresponding to a second request of the plurality of requests without including the tracked items, the second legal JPM file referring to the first legal JPM file.

52. The apparatus defined in claim 51 wherein the portions are selected from a group consisting of one or more desired pages, one or more desired regions on a page, desired resolution for data being returned, a desired technique to receive returned data, and an indication of data from the JPM file that has already been received.

53. The apparatus defined in claim 51 wherein the request is selected from a group consisting of a spatial portion of a page, a lower resolution of a page, a range of pages, and non-label boxes.

54. The apparatus defined in claim 51 wherein at least one of the requests specifies a box type in the JPM file and at least one of the parts of the JPM file includes information stored in one or more of each box of the box type specified in the at least one request.

55. The apparatus defined in claim 54 wherein the at least one request further specifies a sub-box associated with the box type, and wherein the response includes data associated with the sub-box of the box type.

56. The apparatus defined in Claim 51 wherein at least one of the plurality of requests specifies a box in the JPM file starting at an offset.

57. The apparatus defined in claim 56 wherein the response returns all of the contents of the box.

58. The apparatus defined in claim 51 wherein at least one of the plurality of requests specifies page size that a page in the JPM file would take on a display and specifies a portion of an image requested within the page.

59. The apparatus defined in claim 51 wherein at least one parameter in at least one of the plurality of requests indicates a range.

60. The apparatus defined in claim 51 wherein at least one of the plurality of requests includes an offset from an object box to obtain a portion of a codestream pointed to by the offset.

61. The apparatus defined in claim 51 wherein at least one of the plurality of requests specifies a frame size, a region offset, and a region size to identify a portion of a codestream to obtain.

62. The method defined in claim 51 wherein at least one of the plurality of requests includes a page request parameter.

63. The apparatus defined in claim 51 wherein the server core stores the JPM file in an external file storage.

64. The apparatus defined in claim 51 wherein the server core stores the JPM file with a plurality of codestreams in shared data entry boxes.

65. The apparatus defined in claim 51 wherein the server core transmits a JPM file in parts in response to the plurality of requests by transmitting another first JPM file with at least one reference to at least one externally stored file.

66. The apparatus defined in claim 65 wherein the at least one externally stored file comprises at least one externally stored codestream.

67. The apparatus defined in claim 65 further comprising sending another second JPM file with references to data in a previously sent JPM file.

68. The apparatus defined in claim 51 wherein the server core transmits a JPM file in parts in response to the plurality of requests by transmitting the JPM file with changed references for objects that are not part of one or more requests to point to a file on a server without removing pages or layout objects.

69. The apparatus defined in claim 68 wherein the server core sends another JPM file that includes codestream data that extends one or more codestreams in the previously sent JPM file.

* * * * *